US008243850B2

(12) United States Patent
Khan

(10) Patent No.: US 8,243,850 B2
(45) Date of Patent: Aug. 14, 2012

(54) METHOD AND SYSTEM FOR GENERATING REFERENCE SIGNALS IN A WIRELESS COMMUNICATION SYSTEM

(75) Inventor: Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1437 days.

(21) Appl. No.: 11/786,549

(22) Filed: Apr. 11, 2007

(65) Prior Publication Data

US 2010/0008445 A1  Jan. 14, 2010

Related U.S. Application Data

(60) Provisional application No. 60/853,913, filed on Oct. 24, 2006.

(51) Int. Cl.
*H04K 1/02* (2006.01)
(52) U.S. Cl. ........................................ 375/296; 370/208
(58) Field of Classification Search .................. 370/203, 370/208, 334, 335, 342; 375/130, 267, 296; 455/562.1
See application file for complete search history.

(56) References Cited

U.S. PATENT DOCUMENTS

| | | | |
|---|---|---|---|
| 6,493,330 B1 | 12/2002 | Miya et al. | |
| 6,901,062 B2 * | 5/2005 | Scherzer et al. | 370/335 |
| 7,072,325 B1 | 7/2006 | Sato | |
| 7,088,671 B1 * | 8/2006 | Monsen | 370/203 |
| 2003/0095605 A1 * | 5/2003 | Das et al. | 375/262 |
| 2003/0169709 A1 * | 9/2003 | Oki | 370/335 |
| 2004/0257978 A1 * | 12/2004 | Shao et al. | 370/208 |
| 2006/0126490 A1 * | 6/2006 | Hagen et al. | 370/208 |
| 2007/0041464 A1 * | 2/2007 | Kim et al. | 375/267 |
| 2007/0116095 A1 * | 5/2007 | Gerlach | 375/130 |
| 2007/0177732 A1 * | 8/2007 | Schotten et al. | 380/215 |
| 2008/0232504 A1 * | 9/2008 | Ma et al. | 375/267 |

FOREIGN PATENT DOCUMENTS

| | | |
|---|---|---|
| JP | 2004-201296 | 7/2004 |
| JP | 2008-092374 | 4/2008 |
| WO | WO 2005/006588 A2 | 1/2005 |
| WO | WO 2006/049282 A1 | 5/2006 |

OTHER PUBLICATIONS

Yoshihisa Kishiyama, et al., "Orthogonal Pilot Channel for OFDM Radio Access in Evolved UTRA Downlink", Institute of Electronics, Information, and Communication Engineers, Jun. 15, 2006, 7 pages.
Kenichi Kobayashi, et al., "MIMO Systems with Random Unitary Precoding", Institute of Electronics, Information, and Communication Engineers, Oct. 12, 2006, 5 pages.
Notification of Transmittal of The International Search Report and the Written Opinion of the International Searching Authority, or the Declaration, dated Jan. 14, 2008 in connection with PCT Application No. PCT/KR2007/004979.

* cited by examiner

*Primary Examiner* — Leon-Viet Nguyen

(57) ABSTRACT

A method of generating reference signals is provided. The method includes precoding a reference signal to generate a plurality of precoded reference signals. For each precoded reference signal, a signal based on the precoded reference signal is transmitted from a corresponding physical antenna.

20 Claims, 7 Drawing Sheets

METHOD AND SYSTEM FOR GENERATING REFERENCE SIGNALS IN A WIRELESS COMMUNICATION SYSTEM

CROSS-REFERENCE TO RELATED APPLICATION AND CLAIM OF PRIORITY

The present invention is related to the invention disclosed in U.S. Patent Application Ser. No. 60/853,913, titled "Reference Signal Precoding for a MIMO Wireless Communication System," filed on Oct. 24, 2006. Patent Application Ser. No. 60/853,913 is assigned to the assignee of the present application. The subject matter disclosed in Patent Application Ser. No. 60/853,913 is hereby incorporated by reference into the present disclosure as if fully set forth herein. The present application hereby claims priority under 35 U.S.C. §119(e) to Patent Application Ser. No. 60/853,913.

TECHNICAL FIELD OF THE INVENTION

The present disclosure relates generally to wireless communications and, more specifically, to a method and system for generating reference signals in a wireless communication system.

BACKGROUND OF THE INVENTION

Currently-implemented wireless communication networks provide for reference signals (e.g., pilot signals) to be transmitted from a base station to subscriber stations in its coverage area. The subscriber stations use the reference signals to estimate channel conditions. However, transmitting each reference signal uses a significant amount of overhead. The time-frequency slots allocated to the transmission of each reference signal could be used by the base station to transmit data if the reference signal did not need to be transmitted.

Conventional base stations, which have an antenna array with multiple physical antennas, transmit a different reference signal over each physical antenna in the antenna array regardless of the number of channels currently being used. For example, if the antenna array has four antennas but only two data streams are being transmitted, the base station still transmits four reference signals—one over each antenna. This results in wasted time-frequency resources for the additional reference signals. One solution to this problem is to transmit fewer reference signals when transmitting fewer than all data streams and to turn off antennas not being used. However, this results in bursty interference for neighboring cells as the antennas are turned off and on. Therefore, there is a need in the art for an improved method for generating reference signals in a wireless communication system.

SUMMARY OF THE INVENTION

A method for generating reference signals in a wireless communication system is provided. According to an advantageous embodiment of the present disclosure, the method includes precoding a reference signal to generate a plurality of precoded reference signals. For each precoded reference signal, a signal based on the precoded reference signal is transmitted from a corresponding physical antenna.

According to another embodiment of the present disclosure, a method of generating reference signals in a wireless communication system is provided that includes scheduling a plurality of transmit time intervals (TTIs). The TTIs include a plurality of full TTIs and a plurality of limited TTIs. For each of the full TTIs, a full set of possible virtual antennas is created. For each of the limited TTIs, a subset of the possible virtual antennas is created. Each virtual antenna created is operable to provide a corresponding reference signal during the TTI. For each reference signal, each of a plurality of signals generated based on the reference signal is transmitted from a corresponding physical antenna.

According to yet another embodiment of the present disclosure, a base station is provided that includes a reference signal scheduler and a reference signal generator. The reference signal scheduler is operable to schedule a plurality of TTIs for a communication session. The TTIs include a plurality of full TTIs and a plurality of limited TTIs. The reference signal generator is coupled to the reference signal scheduler and is operable to precode a reference signal to generate a plurality of precoded reference signals and, for each precoded reference signal, to transmit a signal based on the precoded reference signal from a corresponding physical antenna.

According to still another embodiment of the present disclosure, a subscriber station is provided that includes a reference signal decoder. The reference signal decoder is operable to decode a composite reference signal that comprises a plurality of precoded reference signals.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
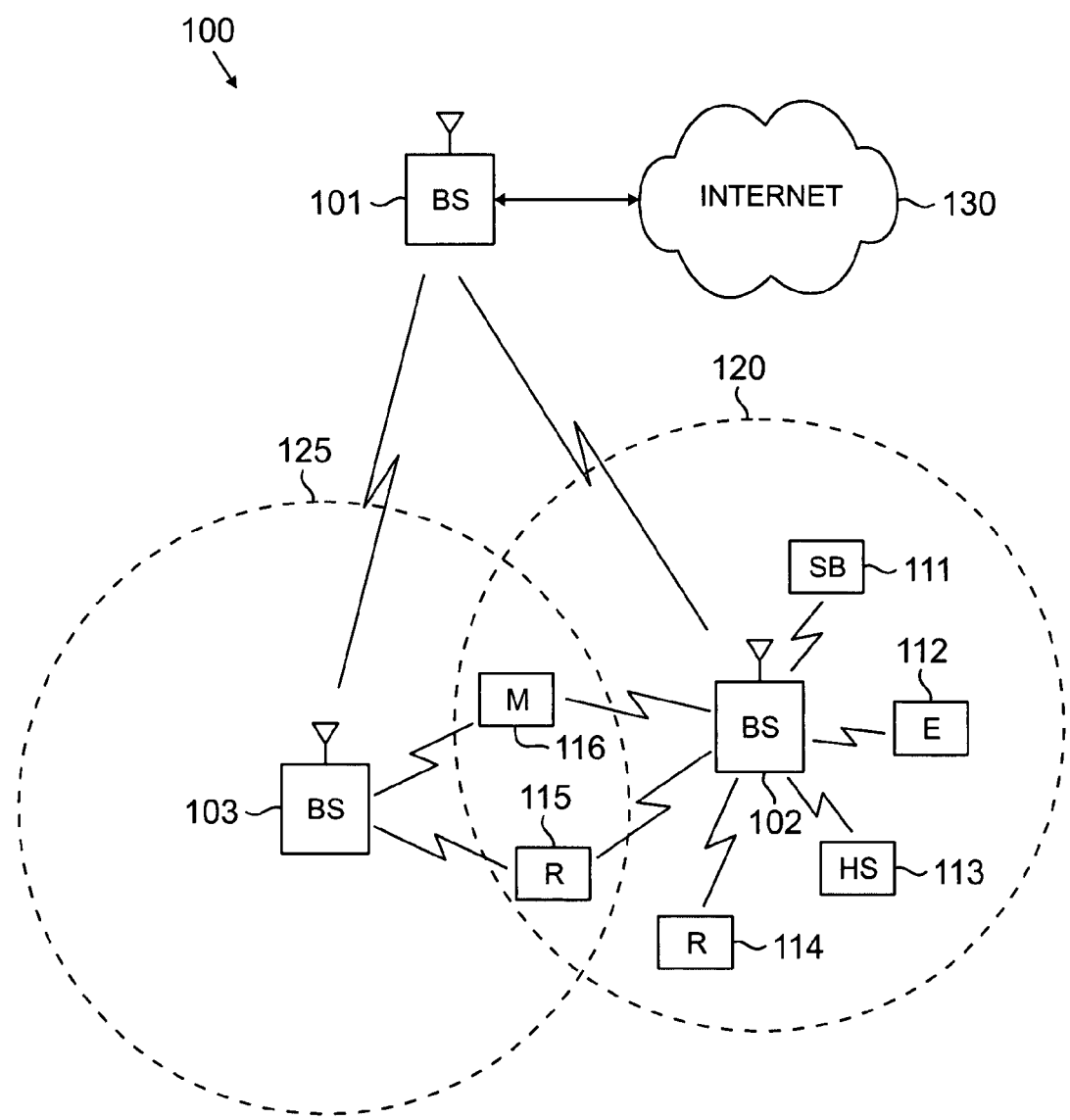
FIG. 1 illustrates an orthogonal frequency division multiplexing (OFDM) wireless network that is capable of providing precoded reference signals according to an embodiment of the present disclosure.

FIG. 1 illustrates an exemplary Orthogonal Frequency Division Multiplexing (OFDM) wireless network 100 that is capable of providing precoded reference signals according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in soft handoff, as known to those of skill in the art.

In an exemplary embodiment, base stations 101-103 may communicate with each other and with subscriber stations 111-116 using an IEEE-802.16, 802.20, or 802.11 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight with base station 102 and base station 103. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from about 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to network 130 may be provided by different network nodes and equipment.

In accordance with an embodiment of the present disclosure, each base station 101-103 is operable to precode each reference signal to generate a plurality of precoded reference signals and to transmit each precoded reference signal over a corresponding transmit antenna of the base station 101-103 such that the full transmit power of the base station 101-103 is used substantially continuously, regardless of the number of reference signals. Similarly, each subscriber station 111-116 is operable to process the precoded reference signals transmitted by the base stations 101-103 by decoding the composite reference signals.

Figure 2:
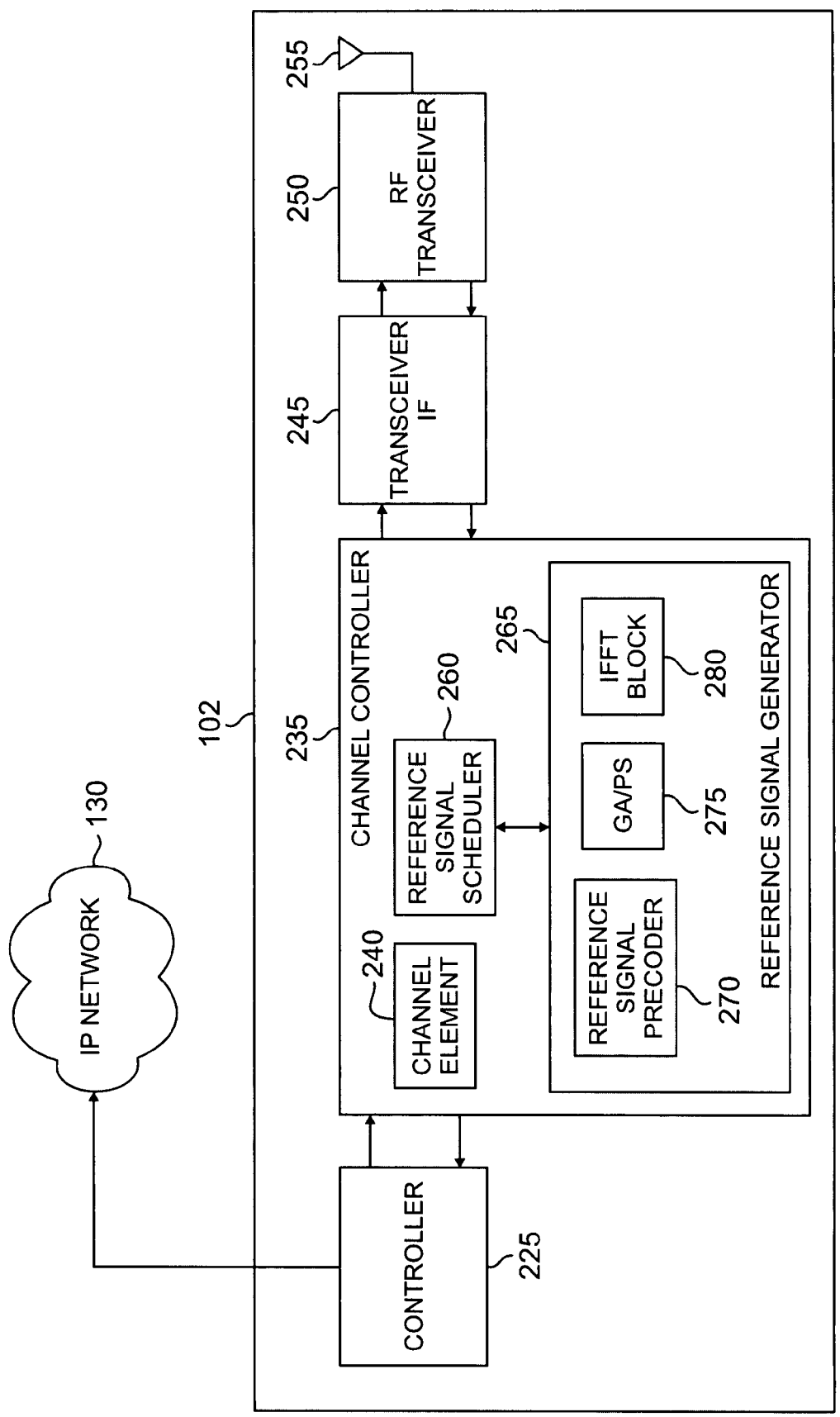
FIG. 2 illustrates an exemplary base station that is capable of generating reference signals according to an embodiment of the present disclosure.

FIG. 2 illustrates exemplary base station 102 in greater detail according to one embodiment of the present disclosure. Base station 102 is illustrated by way of example only. However, it will be understood that the components illustrated and described with respect to base station 102 are also part of base stations 101 and 103. In one embodiment, base station 102 comprises controller 225, channel controller 235, transceiver interface (IF) 245, radio frequency (RF) transceiver unit 250, and antenna array 255.

Controller 225 comprises processing circuitry and memory capable of executing an operating program that controls the overall operation of base station 102. In an embodiment, controller 225 may be operable to communicate with network 130. Under normal conditions, controller 225 directs the operation of channel controller 235, which comprises a number of channel elements, such as exemplary channel element 240, each of which performs bidirectional communication in the forward channel and the reverse channel. A forward channel (or downlink) refers to outbound signals from base station 102 to subscriber stations 111-116. A reverse channel (or uplink) refers to inbound signals from subscriber stations 111-116 to base station 102. Channel element 240 also preferably performs all baseband processing, including processing any digitized received signal to extract the information or data bits conveyed in the received signal, typically including demodulation, decoding, and error correction operations, as known to those of skill in the art. Transceiver IF 245 transfers bidirectional channel signals between channel controller 235 and RF transceiver unit 250.

Antenna array 255 transmits forward channel signals received from RF transceiver unit 250 to subscriber stations 111-116 in the coverage area of base station 102. Antenna array 255 is also operable to send to RF transceiver unit 250 reverse channel signals received from subscriber stations 111-116 in the coverage area of the base station 102. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

In accordance with an embodiment of the present disclosure, channel controller 235 also comprises a reference signal scheduler 260 and a reference signal generator 265. Although illustrated and described as two separate components, it will be understood that reference signal scheduler 260 and reference signal generator 265 may be implemented together in a single component without departing from the scope of the present disclosure.

Reference signal scheduler 260 is operable to schedule transmit time intervals (TTIs) for reference signals to be transmitted from base station 102 to a subscriber station, such as subscriber station 111, for example. For one particular example, each TTI may comprise 1.0 milliseconds. However, it will be understood that each TTI may comprise any suitable amount of time without departing from the scope of this disclosure.

Reference signal generator 265 is operable to create a virtual antenna for each reference signal. Reference signal scheduler 260 is operable to schedule in each TTI, for each of a subset of the virtual antennas, a reference signal for transmission over the virtual antenna. Reference signal scheduler 260 is also operable to schedule in each of a subset of the TTIs, for each of the virtual antennas, a reference signal for transmission over the virtual antenna.

For a particular embodiment, reference signal scheduler 260 may also be operable to synchronize the transmission of specified reference signals with hybrid automatic repeat request (ARQ) timing. For this embodiment, reference signal scheduler 260 allows enough time to elapse between the scheduling of a new packet transmission and the scheduling of a subsequent transmission in order to determine whether the packet should be retransmitted in the subsequent transmission.

Reference signal generator 265 comprises a reference signal precoder 270, an optional gain applier/phase shifter (GA/PS) 275, and an Inverse Fast Fourier Transform (IFFT) block 280. Reference signal precoder 270 is operable to precode each reference signal for a corresponding virtual antenna such that the precoded reference signal may be transmitted over each physical antenna in antenna array 255. The optional GA/PS 275 is operable to apply a gain and/or a phase shift to each precoded reference signal. For some embodiments, the gain and/or phase shift applied by GA/PS 275 may be different for each physical antenna and/or may be different for different sub-carriers and OFDM symbols. In addition, the gains and/or phase shifts may be different for different subscriber stations 111-116.

IFFT block 280 is operable to perform an inverse fast Fourier transform operation on each precoded reference signal, after the application of any gain and/or phase shift by GA/PS 275. Each transformed, precoded reference signal may then be transmitted from a different antenna in antenna array 255. Thus, regardless of the number of reference signals being precoded by reference signal precoder 270, each antenna in antenna array 255 may be transmitting substantially continuously such that the full power of base station 102 is also used substantially continuously.

Figure 3:
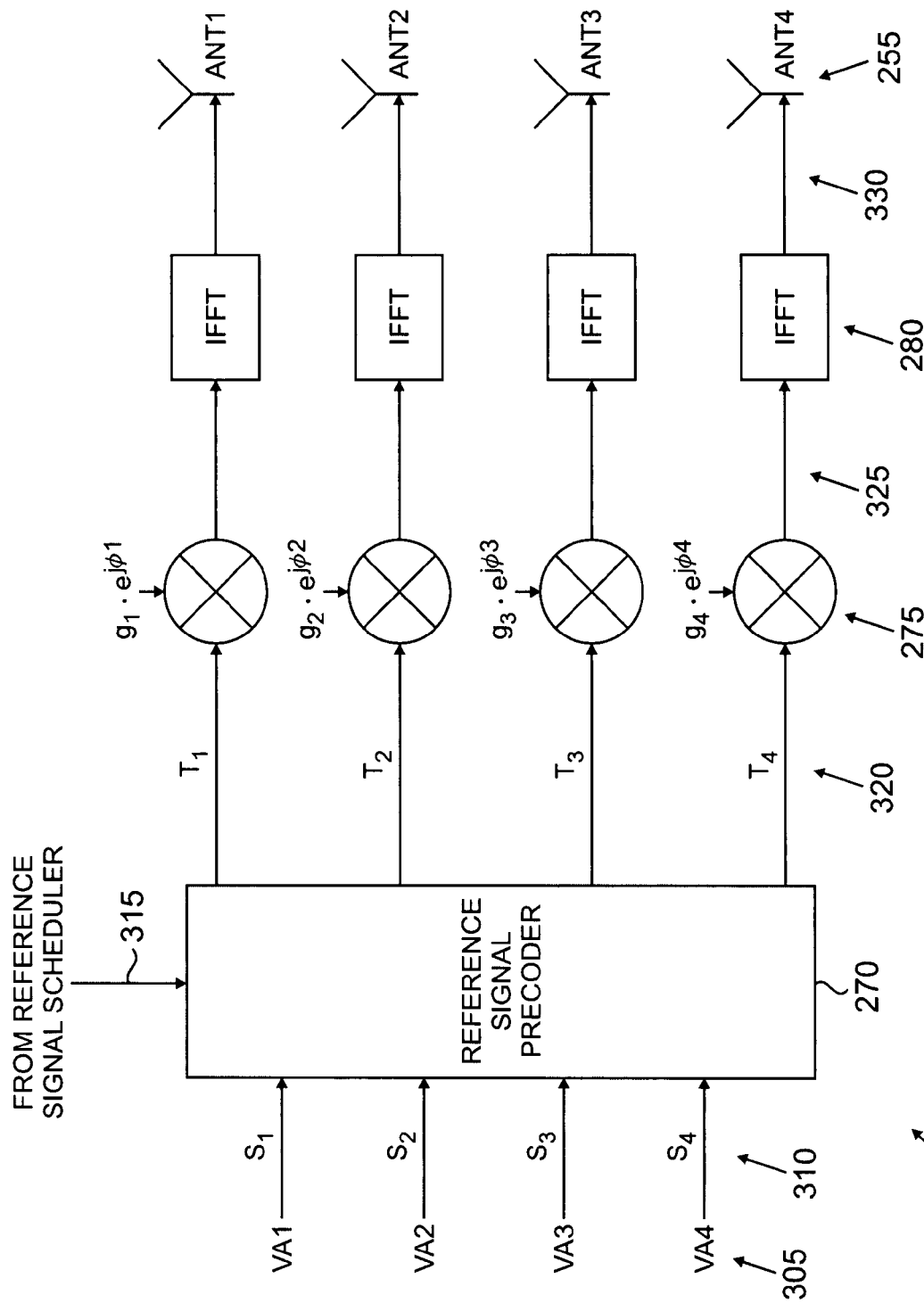
FIG. 3 illustrates details of the reference signal generator of FIG. 2 according to an embodiment of the present disclosure.

FIG. 3 illustrates details of reference signal generator 265 according to an embodiment of the present disclosure. For the illustrated embodiment, reference signal generator 265 comprises a reference signal precoder 270 that is operable to receive up to four reference signals 310 ($S_1$, $S_2$, $S_3$ and/or $S_4$) from four possible virtual antennas 305 (VA1, VA2, VA3 and VA4). In addition, antenna array 255 comprises four antennas. However, it will be understood that reference signal generator 265 may comprise any suitable number of possible virtual antennas 305, which are each operable to provide a reference signal 310, based on the number of antennas in antenna array 255.

Reference signal precoder 270 may be operable to receive a scheduling signal 315 from reference signal scheduler 260.

The scheduling signal 315 is operable to identify time-frequency slots within a resource block for a TTI that are allocated for each virtual antenna 305. Based on the scheduling signal 315, reference signal generator 315 is operable to create a specified number of virtual antennas 305.

Reference signal precoder 270 is operable to apply a precoding matrix, P, to each of the reference signals 310 received from a created virtual antenna 305 in order to generate four precoded reference signals 320 ($T_1$, $T_2$, $T_3$ and $T_4$). If desired, GA/PS 275 may apply a gain (g) and/or a phase shift ($e^{j\Phi}$) to each precoded reference signal 320 to generate an altered, precoded reference signal 325. It will be understood that, as an alternative, any gain and/or phase shift may be applied by GA/PS 275 before the precoding matrix is applied by reference signal precoder 270. IFFT block 280 is operable to perform an inverse fast Fourier transform on each of the precoded reference signals 320 (or the altered, precoded reference signals 325) to generate a transformed, precoded reference signal 330 for transmission over a corresponding physical antenna in antenna array 255.

For a particular example, the precoding matrix, P, may comprise a Fourier-based precoding matrix that may be defined as follows:

$$P = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix}.$$

For this example, the precoded reference signals 320, T, for each reference signal 310, S, may be determined by multiplying the precoding matrix by an S vector corresponding to the reference signal 310 as follows. For the first reference signal 310, $S_1$, $$\begin{bmatrix} T_1 \\ T_2 \\ T_3 \\ T_4 \end{bmatrix} = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix} \times \begin{bmatrix} S_1 \\ 0 \\ 0 \\ 0 \end{bmatrix} = \frac{1}{2}\begin{bmatrix} S_1 \\ S_1 \\ S_1 \\ S_1 \end{bmatrix}.$$

For the second reference signal 310, $S_2$, $$\begin{bmatrix} T_1 \\ T_2 \\ T_3 \\ T_4 \end{bmatrix} = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix} \times \begin{bmatrix} 0 \\ S_2 \\ 0 \\ 0 \end{bmatrix} = \frac{1}{2}\begin{bmatrix} S_2 \\ jS_2 \\ -S_2 \\ -jS_2 \end{bmatrix}.$$

For the third reference signal 310, $S_3$, $$\begin{bmatrix} T_1 \\ T_2 \\ T_3 \\ T_4 \end{bmatrix} = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix} \times \begin{bmatrix} 0 \\ 0 \\ S_3 \\ 0 \end{bmatrix} = \frac{1}{2}\begin{bmatrix} S_3 \\ -S_3 \\ S_3 \\ -S_3 \end{bmatrix}.$$

Finally, for the fourth reference signal 310, $S_4$, $$\begin{bmatrix} T_1 \\ T_2 \\ T_3 \\ T_4 \end{bmatrix} = \frac{1}{2}\begin{bmatrix} 1 & 1 & 1 & 1 \\ 1 & j & -1 & -j \\ 1 & -1 & 1 & -1 \\ 1 & -j & -1 & j \end{bmatrix} \times \begin{bmatrix} 0 \\ 0 \\ 0 \\ S_4 \end{bmatrix} = \frac{1}{2}\begin{bmatrix} S_4 \\ -jS_4 \\ -S_4 \\ jS_4 \end{bmatrix}.$$

Thus, for this example, when the scheduling signal 315 indicates that the fourth reference signal 310, $S_4$, is to be transmitted in a particular time-frequency slot, reference signal precoder 270 generates a precoded reference signal 320 of $S_4$ for transmission over a first antenna in antenna array 255, a precoded reference signal 320 of $-jS_4$ for transmission over a second antenna in antenna array 255, a precoded reference signal 320 of $-S_4$ for transmission over a third antenna in antenna array 255, and a precoded reference signal 320 of $jS_4$ for transmission over a fourth antenna in antenna array 255. As described above, it will be understood that these precoded reference signals 320 may have gains, phase shifts and/or IFFT operations applied before transmission. In addition, it will be understood that, depending on the number of virtual antennas 305 created, multiple reference signals 310 may be precoded simultaneously for transmission at different frequencies in accordance with a reference signal structure, such as the reference signal structure described below in connection with FIG. 6.

Figure 4:
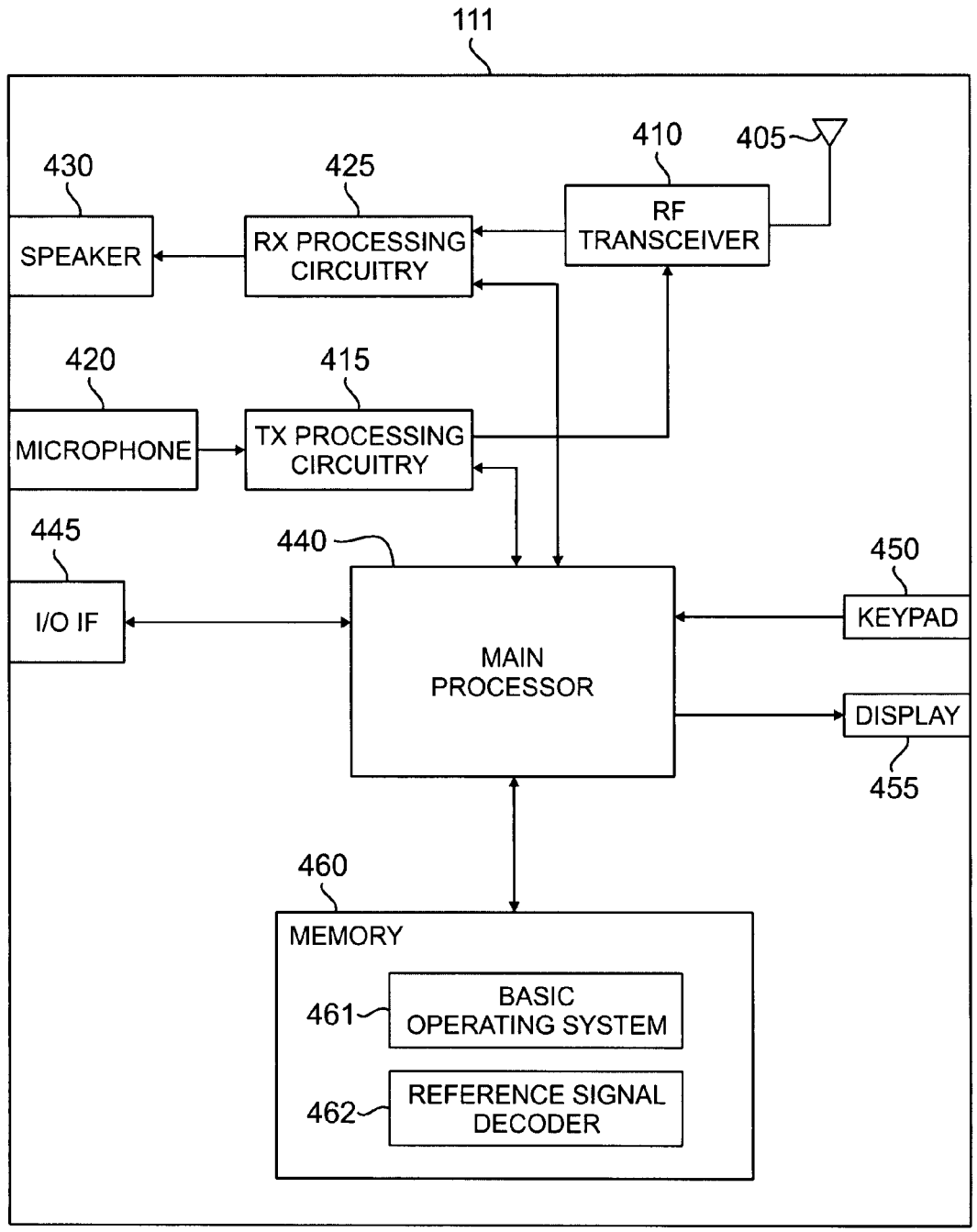
FIG. 4 illustrates an exemplary subscriber station that is capable of processing precoded reference signals generated by the base station of FIG. 2 according to an embodiment of the present disclosure.

FIG. 4 illustrates wireless subscriber station 111 according to an advantageous embodiment of the present disclosure. Wireless subscriber station 111 comprises antenna array 405, radio frequency (RF) transceiver 410, transmit (TX) processing circuitry 415, microphone 420, and receive (RX) processing circuitry 425. MS 111 also comprises speaker 430, main processor 440, input/output (I/O) interface (IF) 445, keypad 450, display 455, and memory 460. Memory 460 further comprises basic operating system (OS) program 461 and reference signal decoder 462.

Radio frequency (RF) transceiver 410 receives from antenna array 405 an incoming RF signal transmitted by a base station of wireless network 100. Radio frequency (RF) transceiver 410 down-converts the incoming RF signal to produce an intermediate frequency (IF) or a baseband signal. The IF or baseband signal is sent to receiver (RX) processing circuitry 425 that produces a processed baseband signal by filtering, decoding, and/or digitizing the baseband or IF signal. Receiver (RX) processing circuitry 425 transmits the processed baseband signal to speaker 430 (i.e., voice data) or to main processor 440 for further processing (e.g., web browsing).

Transmitter (TX) processing circuitry 415 receives analog or digital voice data from microphone 420 or other outgoing baseband data (e.g., web data, e-mail, interactive video game data) from main processor 440. Transmitter (TX) processing circuitry 415 encodes, multiplexes, and/or digitizes the outgoing baseband data to produce a processed baseband or IF signal. Radio frequency (RF) transceiver 410 receives the outgoing processed baseband or IF signal from transmitter (TX) processing circuitry 415. Radio frequency (RF) transceiver 410 up-converts the baseband or IF signal to a radio frequency (RF) signal that is transmitted via antenna array 405.

In an advantageous embodiment of the present disclosure, main processor 440 is a microprocessor or microcontroller. Memory 460 is coupled to main processor 440. According to an advantageous embodiment of the present disclosure, part of memory 460 comprises a random access memory (RAM)

and another part of memory 460 comprises a non-volatile memory, such as Flash memory, which acts as a read-only memory (ROM).

Main processor 440 executes basic operating system (OS) program 461 stored in memory 460 in order to control the overall operation of wireless subscriber station 111. In one such operation, main processor 440 controls the reception of forward channel signals and the transmission of reverse channel signals by radio frequency (RF) transceiver 410, receiver (RX) processing circuitry 425, and transmitter (TX) processing circuitry 415, in accordance with well-known principles.

Main processor 440 is also operable to execute reference signal decoder 462. Reference signal decoder 462 is operable to decode composite reference signals received from base station 102. Thus, reference signal decoder 462 is operable to process the precoded, composite reference signals and to identify the original reference signals transmitted by the base station 102 using any suitable decoding technique.

For a particular example in which the precoding matrix is the Fourier-based precoding matrix described above in connection with FIG. 3, two reference signals 310 may be provided by two virtual antennas 305 to reference signal precoder 270, and the reference signals 310 may be transmitted, after precoding, over four physical antennas 255. In addition, for this example, a flat-fading channel static over a TTI may be assumed. Two composite channels, $h_{c1}$ and $h_{c2}$, that correspond to the two virtual antennas 305 may be estimated in this example as follows:

$$h_{c1} = S_1(h_1+h_2+h_3+h_4) \cdot S^*_1 = h_1+h_2+h_3+h_4$$

$$h_{c2} = S_2(h_1-h_2+h_3-h_4) \cdot S^*_2 = h_1-h_2+h_3-h_4$$

where $S_2$ is provided by the third virtual antenna 305 and, thus, corresponds to $S_3$ in the example described in connection with FIG. 3 (without taking into account the GA/PS 275, as described below). In addition, $h_1$, $h_2$, $h_3$ and $h_4$ are the channel gains from the physical antenna 1, antenna 2, antenna 3 and antenna 4, respectively. In the case of a time-frequency selective channel, the channels gains may be different for different sub-carriers and/or OFDM symbols. For example, channel gain $h_{1,ij}$ may represent the channel gain from physical antenna 1 in the $i^{th}$ sub-carrier and the $j^{th}$ OFDM symbol.

Continuing with the above example using the first and third virtual antennas 305, reference signal decoder 462 may be operable to decode the received signals, $R_1$ and $R_2$, using the composite channels $h_{c1}$ and $h_{c2}$ as follows:

$$R_1 = S_1 h_{c1} = S_1(h_1+h_2+h_3+h_4)$$

$$R_2 = S_2 h_{c2} = S_2(h_1-h_2+h_3-h_4)$$

For an example in which a single virtual antenna 305 provides a single reference signal 310 to four physical antennas 255, the composite channel $h_{c1}$ may be estimated as follows:

$$h_{c1} = S_1(h_1+h_2+h_3+h_4) \cdot S^*_1 = h_1+h_2+h_3+h_4.$$

For an example in which four virtual antennas 305 are each operable to provide a corresponding reference signal 310 to four physical antennas 255, the composite channels $h_{c1}$, $h_{c2}$, $h_{c3}$ and $h_{c4}$ may be estimated as follows:

$$h_{c1} = h_1+h_2+h_3+h_4$$

$$h_{c2} = h_1+jh_2-h_3-jh_4$$

$$h_{c3} = h_1-h_2+h_3-h_4$$

$$h_{c4} = h_1-jh_2-h_3+jh_4$$

For an example in which three virtual antennas 305 are each operable to provide a corresponding reference signal 310 to four physical antennas 255, the composite channels $h_{c1}$, $h_{c2}$ and $h_{c3}$ may be estimated as follows:

$$h_{c1} = h_1+h_2+h_3+h_4$$

$$h_{c2} = h_1+jh_2-h_3-jh_4$$

$$h_{c3} = h_1-h_2+h_3-h_4$$

It will be understood that precoding matrices other than the Fourier-based precoding matrix described above, such as a Householder precoding matrix, a Hadamard precoding matrix or the like, may be used by reference signal precoder 270 to create a set of virtual antennas 305 from the physical antennas 255.

For the embodiment in which reference signal generator 265 comprises GA/PS 275, the precoded reference signals 320 may be multiplied with a gain and/or phase-shifted before transmission from multiple transmit antennas 255. For this embodiment, the composite channel for virtual antenna 1 ($h_{c1}$), for example, may be estimated as follows:

$$h_{c1} = h_1 \cdot g_1 e^{j\phi_1} + h_2 \cdot g_2 e^{j\phi_2} + h_3 \cdot g_3 e^{j\phi_3} + h_4 \cdot g_4 e^{j\phi_4},$$

where $g_i e^{j\phi_i}$ is the gain and phase shift applied to the $i^{th}$ physical transmit antenna 255.

It should be noted that, when a set of virtual antennas 305 is created from a set of physical antennas 255, the MIMO and transmit diversity schemes may work based on a virtual antenna-basis. For example, spatial multiplexing may be done on virtual antennas 305 or MIMO layers. For this embodiment, the column selection for multi-user MIMO simply becomes virtual antenna selection. The channel quality for a virtual antenna 305 is estimated by using the reference signal 310 for the corresponding virtual antenna 305. This may potentially simplify the operation of subscriber station 111. Similarly, the transmit diversity may be done on virtual antennas 305. Beamforming may also be performed on virtual antennas 305 using, for example, precoding. For example, when two virtual antennas 305 are created from two physical antennas using precoding matrix A and subscriber station 111 desires precoding using matrix B for data, then the data symbols for subscriber station 111 may be precoded by a precoding matrix, P=A×B. For a particular example, the precoding matrix may be defined as follows:

$$P = A \times B = \begin{bmatrix} 1 & 1 \\ 1 & -1 \end{bmatrix} \times \begin{bmatrix} 1 & 1 \\ j & -j \end{bmatrix} = \begin{bmatrix} 1+j & 1-j \\ 1-j & 1+j \end{bmatrix}.$$

This is because the channel estimates are based on the precoding matrix A being applied to the reference signals 310.

Figure 5:
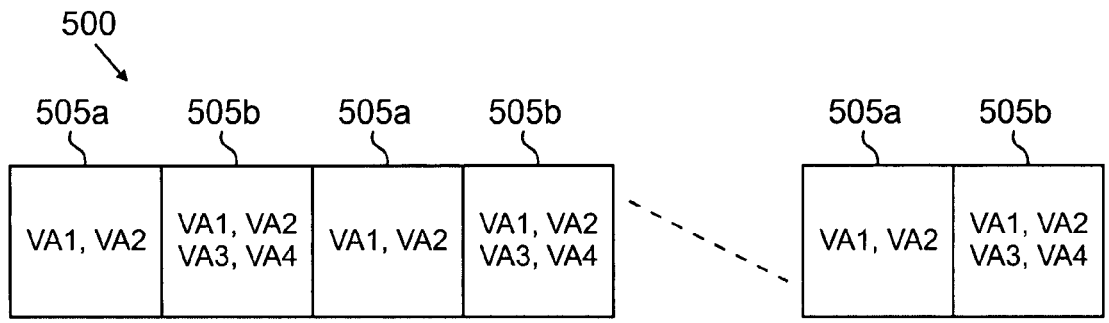
FIG. 5 illustrates one example of reference signal scheduling provided by the reference signal scheduler of FIG. 2 according to an embodiment of the present disclosure.

FIG. 5 illustrates one example of reference signal scheduling 500 provided by reference signal scheduler 260 according to an embodiment of the present disclosure. For this embodiment, precoded reference signals (such as transformed, precoded reference signals 330) are transmitted over a subset of virtual antennas 305 in each TTI 505, while precoded reference signals from each virtual antenna 305 are transmitted over a subset of the TTIs 505b.

For the illustrated embodiment, for each of a plurality of limited TTIs 505a, two virtual antennas 305 (VA1 and VA2) provide reference signals 310 for transmission. In addition, for each of a plurality of full TTIs 505b, all four virtual antennas 305 (VA1, VA2, VA3 and VA4) provide reference signals 310 for transmission. As used herein, a "limited TTI" means a TTI 505a in which a subset of the possible virtual antennas 305 are created, and a "full TTI" means a TTI 505*b* in which all possible virtual antennas 305 are created.

It will be understood that any suitable subset of virtual antennas 305 may provide reference signals 310 for transmission in the limited TTIs 505*a*. For example, although the illustrated embodiment includes two virtual antennas 305 in the limited TTIs 505*a*, one or three virtual antennas 305 may be used instead when the maximum number of possible virtual antennas 305 is four. It will also be understood that, although the illustrated embodiment shows a pattern of alternating limited TTIs 505*a* and full TTIs 505*b*, any suitable pattern of limited TTIs 505*a* and full TTIs 505*b* may be generated.

Figure 6:
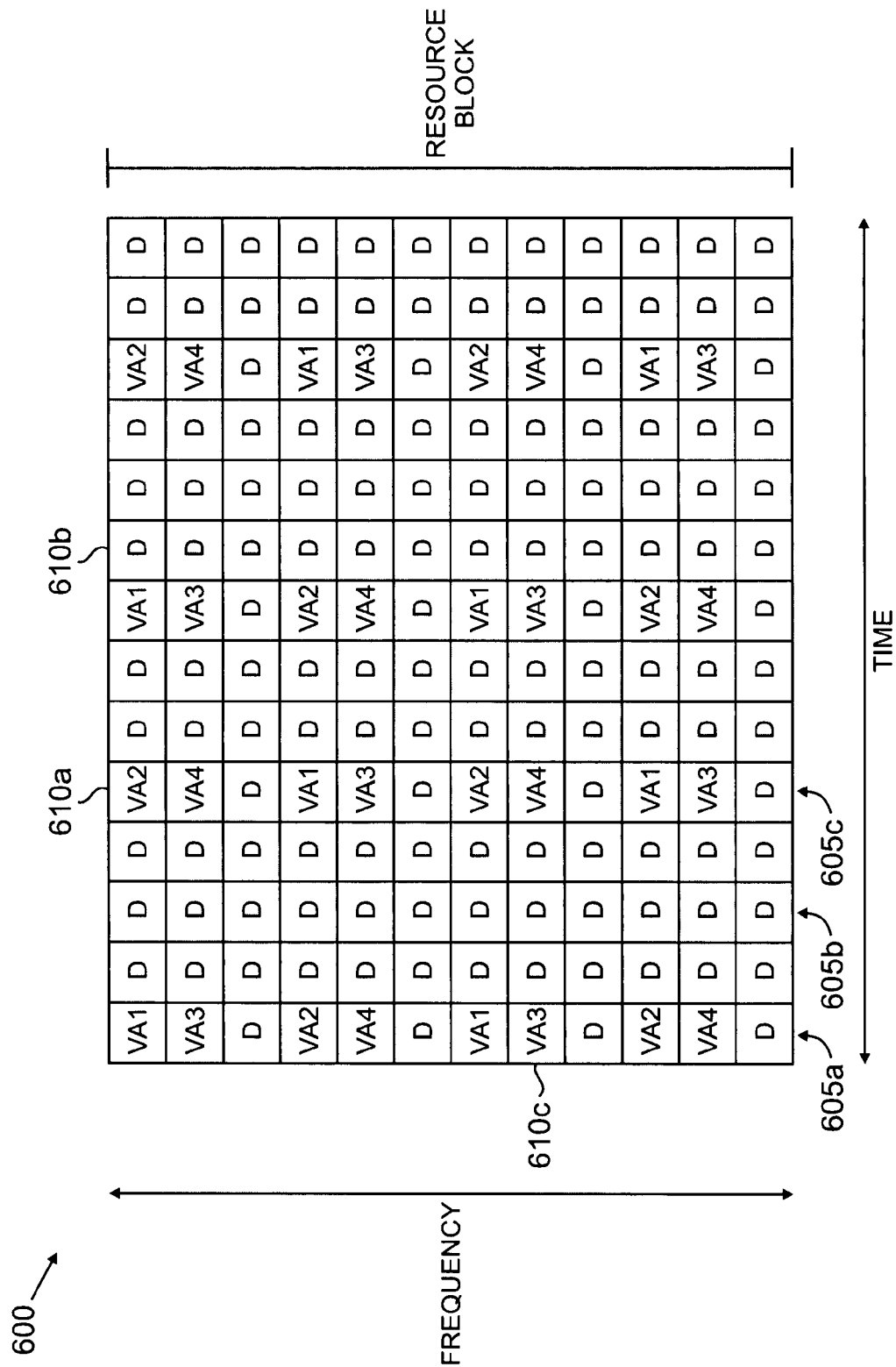
FIG. 6 illustrates one example of a reference signal structure that may be generated by the reference signal scheduler of FIG. 2 according to an embodiment of the present disclosure.

FIG. 6 illustrates one particular example of a reference signal structure 600 for a single TTI that may be generated by reference signal scheduler 260 according to an embodiment of the present disclosure. For the illustrated embodiment, a resource block of twelve sub-carriers is shown. However, it will be understood that resource blocks of other suitable sizes may be used. In addition, for one embodiment, the length of time illustrated may correspond to a 1.0-ms TTI. However, it will be understood that a TTI of another suitable length may be used.

The reference signal structure 600 comprises a plurality of time slices 605, each of which comprises a plurality of time-frequency slots 610. For example, the illustrated embodiment explicitly labels time slices 605*a-c* and time-frequency slots 610*a-c*. However, it will be understood that each column in the reference signal structure 600 comprises a time slice 605 and each box comprises a time-frequency slot 610. The time slices 605*a* and 605*c* have some time-frequency slots 610 allocated to virtual antennas 305, while the time slice 605*b* has no time-frequency slots 605 allocated to virtual antennas 305. Time-frequency slots 605 that are not allocated to virtual antennas 305 are labeled with a 'D' and may be allocated to control information or data. For example, the time-frequency slot 610*a* is allocated to virtual antenna 2, the time-frequency slot 610*b* is allocated to control information or data, and the time-frequency slot 610*c* is allocated to virtual antenna 3.

For the illustrated embodiment, the reference signal structure 600 includes scheduling for four virtual antennas 305 (VA1, VA2, VA3 and VA4). It will be understood that, for a limited TTI, such as TTI 505*a* in which two reference signals 310 are provided by two virtual antennas 305 (VA1 and VA2), the time-frequency slots 610 scheduled for VA3 and VA4 may be used to transmit data or control information. Similarly, if a limited TTI includes a single virtual antenna 305 (VA1), the time-frequency slots 610 scheduled for VA2, VA3 and VA4 may be used to transmit data or control information, and if a limited TTI includes three virtual antennas 305 (VA1, VA2 and VA3), the time-frequency slots 610 scheduled for VA4 may be used to transmit data or control information. In this way, the system bandwidth efficiency may be maximized.

Figure 7:
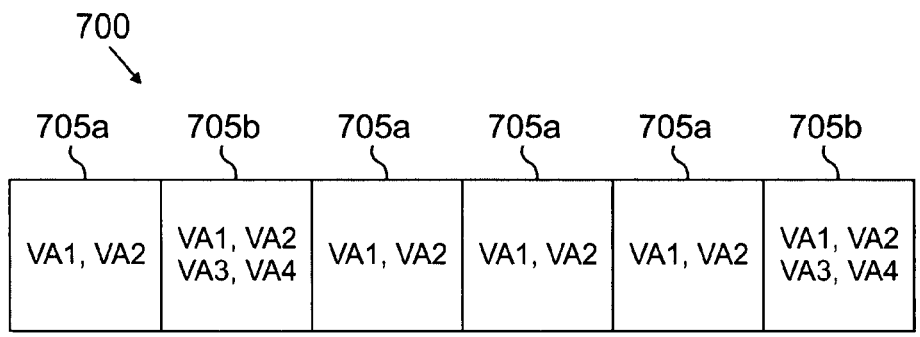
FIG. 7 illustrates one example of reference signal scheduling provided by the reference signal scheduler of FIG. 2 according to an alternate embodiment of the present disclosure.

FIG. 7 illustrates one example of reference signal scheduling 700 provided by reference signal scheduler 260 according to an alternate embodiment of the present disclosure. As described above in connection with FIG. 5, any suitable pattern of limited TTIs and full TTIs may be implemented. In addition, as described above in connection with FIG. 2, reference signal scheduler 260 may be operable to synchronize the transmission of specified reference signals 310 with hybrid ARQ timing, allowing enough time to elapse between full TTIs in order to determine whether a packet transmitted in a full TTI should be retransmitted in a subsequent full TTI.

Thus, as illustrated in FIG. 7, for one such embodiment, three limited TTIs 705*a* may be provided after each full TTI 705*b* in order to provide enough time for a NACK to be received in response to a first packet transmitted during a full TTI 705*b* before a subsequent full TTI 705*b*. Thus, if the NACK is received, base station 102 may retransmit the packet in the subsequent full TTI 705*b*.

For the illustrated embodiment, reference signals 310 provided by the $3^{rd}$ and $4^{th}$ virtual antennas 305 (VA3 and VA4) are synchronized with hybrid ARQ timing. In the example, a new packet is transmitted using all four virtual antennas 305 in the second TTI 705, which is the first full TTI 705*b*. The number of hybrid ARQ processes is assumed to be four such that a packet transmitted in an $n^{th}$ TTI 705 may be retransmitted in an $(n+4)^{th}$ TTI 705. Thus, if the new packet transmission fails in the second TTI 705, base station 102 may retransmit the packet in the sixth TTI 705. Since the full TTIs 705*b* are synchronized with hybrid ARQ timing, the sixth TTI 705 comprises a full TTI 705*b*.

Figure 8:
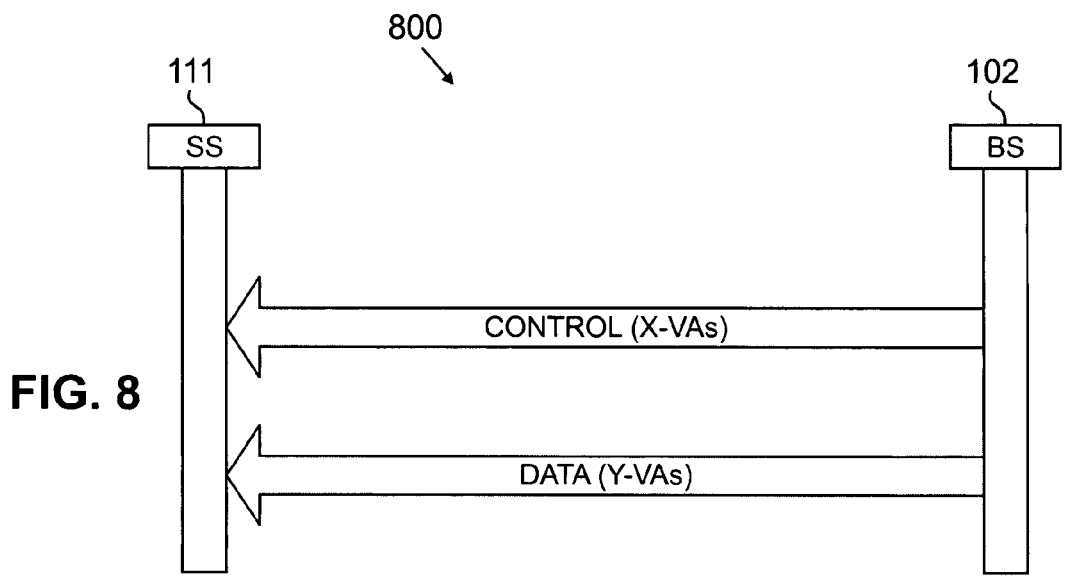
FIG. 8 illustrates the transmission of control information and data from the base station of FIG. 2 to the subscriber station of FIG. 4 according to an embodiment of the present disclosure.

FIG. 8 illustrates the transmission 800 of control information and data from base station 102 to subscriber station 111 according to an embodiment of the present disclosure. As illustrated, X virtual antennas 305 are used to transmit control information, such as the broadcast channel (BCH) information, and Y virtual antennas 305 are used to transmit the data.

For one embodiment, X may be a predefined, constant value and Y may be a variable set by base station 102. For example, X may be defined to be two. For this particular example, base station 102 always transmits the control information using two virtual antennas 305. Base station 102 may provide the number of virtual antennas 305 for data transmission, Y, within the control information. Thus, subscriber station 111 may assume the control information will be received over two virtual antennas 305 and decode the control information using that assumption. Subscriber station 111 may then determine based on the decoded control information how many virtual antennas 305 will be used to provide data.

For one embodiment, the control information may be transmitted using a transmit diversity scheme for higher reliability. The broadcast control channel may also carry the control information on the full TTIs, such as TTIs 505*b* or 705*b*. When subscriber station 111 is interested in data transmission using four virtual antennas 305, subscriber station 111 may make channel quality measurements in the full TTIs, and base station 102 may accordingly perform data transmissions to subscriber station 111 in the full TTIs.

Figure 9:
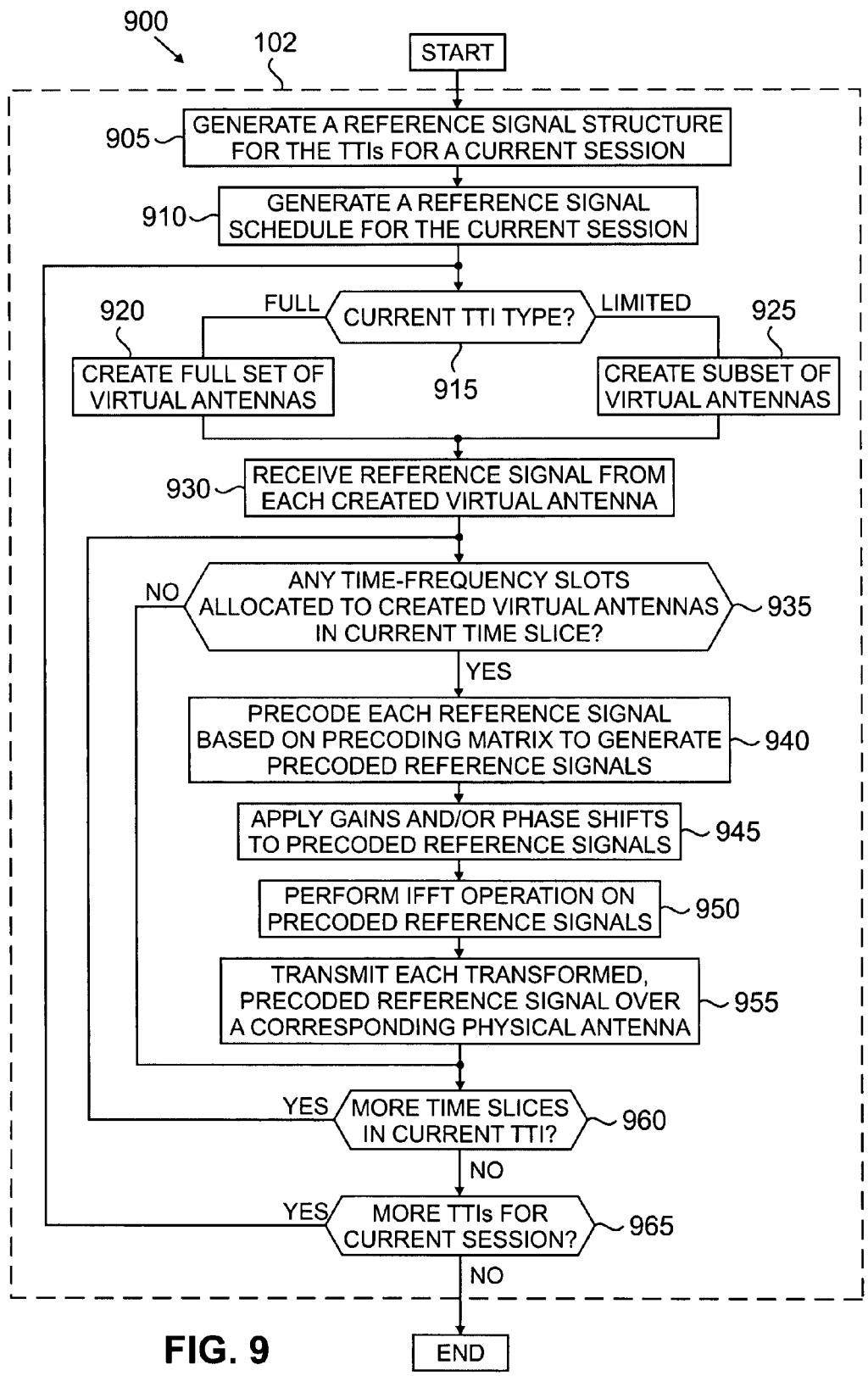
FIG. 9 is a flow diagram illustrating a method for generating reference signals in the base station of FIG. 2 according to an embodiment of the present disclosure.

FIG. 9 is a flow diagram illustrating a method 900 for generating reference signals in base station 102 according to an embodiment of the present disclosure. Initially, reference signal scheduler 260 generates a reference signal structure, such as reference signal structure 600 or other suitable structure, for the TTIs for a current communication session with a subscriber station, such as subscriber station 111 (process step 905).

Reference signal scheduler 260 also generates a reference signal schedule, such as scheduling 500 or 700, that provides a pattern of limited TTIs and full TTIs for the current communication session (process step 910). When a current TTI is a full TTI, such as TTI 505*b* or 705*b* (process step 915), reference signal generator 265 creates a full set of virtual antennas (process step 920). However, when the current TTI is a limited TTI, such as TTI 505*a* or 705*a* (process step 915), reference signal generator 265 creates a subset of the possible virtual antennas (process step 925). The TTI may be identified as full or limited in process step 915 by reference signal generator 265 based on the reference signal schedule generated by reference signal scheduler 260. In addition, the particular subset of virtual antennas 305 to be created in process step 925 may be determined based on the reference signal schedule generated by reference signal scheduler 260.

Reference signal precoder 270 receives a reference signal 310 from each virtual antenna 305 that has been created (process step 930). Reference signal precoder 270 then determines whether any time-frequency slots 610 in a current time slice 605 are allocated to any of the created virtual antennas 305 (process step 935). For one embodiment, reference signal precoder 270 may make this determination based on a scheduling signal 315 received from reference signal scheduler 260.

If the current time slice 605 comprises a time-frequency slot 610 allocated to a created virtual antenna 305 (process step 935), reference signal precoder 270 precodes each reference signal 310 received from a created virtual antenna 305 by applying a precoding matrix, such as the Fourier-based precoding matrix described above or other suitable precoding matrix, in order to generate a specified number of precoded reference signals 320 based on each received reference signal 310 (process step 940). The specified number of precoded reference signals 320 corresponds to the number of physical antennas in antenna array 255. For a particular example, antenna array 255 may comprise four physical antennas. Therefore, for this example, the specified number is four.

GA/PS 275 may apply a gain and/or a phase shift to any or all of the precoded reference signals 320 to generate an altered, precoded reference signal 325 for each precoded reference signal 320 (process step 945). IFFT block 280 performs an IFFT operation on the precoded reference signals 320 (or if step 945 is performed, on the altered, precoded reference signals 325) to generate a transformed, precoded reference signal 330 for each precoded reference signal 320 (or for each altered, precoded reference signal 325) (process step 950). Each transformed, precoded reference signal 330 is transmitted over a corresponding physical antenna in antenna array 255 (process step 955).

It will be understood that, for limited TTIs, any time-frequency slots 610 allocated to a virtual antenna 305 that was not created for the limited TTI may be used to transmit control information or data.

When the current time slice 605 does not comprise a time-frequency slot 610 allocated to a created virtual antenna 305 (process step 935) or after each transformed, precoded reference signal 330 is transmitted (process step 955), a determination is made regarding whether or not more time slices 605 remain in the current TTI (process step 960).

If more time slices 605 remain in the current TTI (process step 960), reference signal precoder 270 determines whether a subsequent time slice 605, which has become the current time slice 605, comprises any time-frequency slots 610 allocated to a created virtual antenna 305 (process step 935), and the method continues as before.

However, if no more time slices 605 remain in the current TTI (process step 960), a determination is made regarding whether or not more TTIs remain in the current communication session (process step 965). If more TTIs remain in the current communication session (process step 965), another determination is made regarding whether or not a subsequent TTI, which has become the current TTI, is a full TTI or a limited TTI (process step 915), and the method continues as before. However, if no more TTIs remain in the current communication session (process step 965), the method comes to an end.

In this way, the full transmit power of base station 102 may be used regardless of the number of data streams and reference signals being transmitted. Because each physical antenna in antenna array 255 transmits a transformed, precoded reference signal 330 for each single reference signal 310, each physical antenna is transmitting even when only one reference signal 310 is being used. Thus, while overhead may be reduced for limited TTIs in which fewer than all the reference signals 310 are present, thereby freeing up time-frequency slots for data transmission, the full power of the base station 102 is still used substantially continuously. As a result, bursty interference for neighboring coverage areas, such as coverage area 125, is avoided.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method, comprising:
receiving one or more reference signals from a corresponding one or more virtual antennas;
precoding the one or more reference signals to generate a plurality of precoded reference signals, wherein the quantity of reference signals differs from a quantity of physical antennas of a base station while the quantity of precoded reference signals equals to the quantity of physical antennas;
applying a gain and a phase shift to each precoded reference signal to generate an altered precoded reference signal;
performing an inverse fast Fourier transform (IFFT) operation on each altered precoded reference signal to generate a transformed precoded reference signal; and
for each transformed precoded reference signal, transmitting a signal comprising the transformed precoded reference signal from a corresponding one of the physical antennas.

2. The method as set forth in claim 1, further comprising generating a reference signal structure for a plurality of transmit time intervals (TTIs) for a communication session.

3. The method as set forth in claim 2, wherein the TTIs for the communication session comprise a plurality of limited TTIs and a plurality of full TTIs, the method further comprising:
generating a reference signal schedule for the communication session, the reference signal schedule comprising a specified pattern of limited TTIs and full TTIs.

4. The method as set forth in claim 3, wherein the specified pattern comprises alternating limited TTIs and full TTIs.

5. The method as set forth in claim 3, wherein the specified pattern is configured to synchronize the full TTIs with hybrid automatic repeat request (ARQ) timing.

6. A method of generating reference signals in a wireless communication system, the method comprising:
scheduling a plurality of transmit time intervals (TTIs), the TTIs comprising a plurality of full TTIs and a plurality of limited TTIs;
creating a full set of possible virtual antennas for each of the full TTIs and creating a subset of possible virtual antennas for each of the limited TTIs, wherein each virtual antenna is configured to provide a corresponding reference signal during a TTI; and
for each reference signal, transmitting each of a plurality of signals generated based on the reference signal from a corresponding physical antenna, wherein a gain and a phase shift are applied to each reference signal to generate an altered reference signal, an inverse fast Fourier transform (IFFT) operation is performed on each altered reference signal to generate a transformed reference signal, and the transmitted signals comprise the transformed reference signal;

transmitting signals corresponding to the full TTI when a hybrid automatic repeat request (ARQ) packet is transmitted by a base station; and transmitting signals corresponding to the limited TTI when the base station is waiting for a response to the hybrid ARQ packet.

7. The method as set forth in claim 6, further comprising precoding each reference signal to generate a plurality of precoded reference signals.

8. The method as set forth in claim 6, further comprising generating a reference signal structure for the TTIs.

9. The method as set forth in claim 6, wherein scheduling the TTIs comprises generating a specified pattern of the limited TTIs and the full TTIs.

10. The method as set forth in claim 9, wherein the specified pattern comprises alternating limited TTIs and full TTIs.

11. A base station, comprising:

a reference signal scheduler configured to schedule a plurality of transmit time intervals (TTIs) for a communication session, the TTIs comprising a plurality of full TTIs and a plurality of limited TTIs; and a reference signal generator coupled to the reference signal scheduler, the reference signal generator configured to precode a plurality of reference signals to generate a plurality of precoded reference signals, to apply a gain and a phase shift to each precoded reference signal to generate an altered precoded reference signal, and to perform an inverse fast Fourier transform (IFFT) operation on each altered precoded reference signal to generate a transformed precoded reference signal wherein the base station is configured to transmit a signal comprising the transformed precoded reference signal, wherein the transmitted signal comprises the full TTI when a hybrid ARQ packet is transmitted by the base station, and the transmitted signal comprises the limited TTI when the base station is waiting for a response to the hybrid ARO packet.

12. The base station as set forth in claim 11, wherein the reference signal generator is further configured, for each of the full TTIs, to create a full set of possible virtual antennas, and for each of the limited TTIs, to create a subset of possible virtual antennas, wherein each virtual antenna created configured to provide a corresponding reference signal during the TTI.

13. The base station as set forth in claim 11, wherein the reference signal scheduler is further configured to schedule the TTIs by generating a reference signal schedule, the reference signal schedule comprising a specified pattern of limited TTIs and full TTIs.

14. The base station as set forth in claim 13, wherein the specified pattern comprises alternating limited TTIs and full TTIs.

15. The base station as set forth in claim 11, wherein the base station is configured to transmit control information from a specified number of virtual antennas and to transmit data from a variable number of virtual antennas, the control information configured to identify the variable number of virtual antennas used for transmitting data.

16. A subscriber station, comprising:

a reference signal decoder configured to decode a composite reference signal, the composite reference signal comprising one or more precoded reference signals, wherein the one or more precoded reference signals are generated by one or more virtual antennas, wherein a gain and a phase shift are applied to each precoded reference signal to generate an altered precoded reference signal, and wherein an inverse fast Fourier transform (IFFT) operation is performed on each altered precoded reference signal to generate a transformed precoded reference signal, wherein the transformed precoded reference signals are configured to be transmitted by a corresponding plurality of physical antennas of a base station, the quantity of reference signals being different from a quantity of the physical antennas while the quantity of precoded reference signals are equal to the quantity of the physical antennas.

17. The subscriber station as set forth in claim 16, wherein each precoded reference signal is configured to be transmitted from a corresponding physical antenna.

18. The subscriber station as set forth in claim 16, wherein the reference signal decoder is further configured to decode control information from a specified number of the plurality of the virtual antennas, the control information configured to identify a variable number of the virtual antennas used for transmitting data.

19. The method as set forth in claim 6, further comprising transmitting a sufficient quantity of limited TTIs to allow the response to the transmitted hybrid ARQ packet to be received.

20. The base station as set forth in claim 11, wherein the base station is configured to transmit a sufficient quantity of limited TTIs to allow the response to the transmitted hybrid ARQ packet to be received.

* * * * *